US006648711B1

(12) United States Patent
Jang et al.

(10) Patent No.: US 6,648,711 B1
(45) Date of Patent: Nov. 18, 2003

(54) FIELD EMITTER HAVING CARBON NANOTUBE FILM, METHOD OF FABRICATING THE SAME, AND FIELD EMISSION DISPLAY DEVICE USING THE FIELD EMITTER

(75) Inventors: Jin Jang, Seoul (KR); Suk-jae Chung, Seoul (KR); Sung-hoon Lim, Seoul (KR); Jae-eun Yoo, Seoul (KR)

(73) Assignee: Iljin Nanotech Co., Ltd. (KR)

( * ) Notice: Subject to any disclaimer, the term of this patent is extended or adjusted under 35 U.S.C. 154(b) by 333 days.

(21) Appl. No.: 09/592,257

(22) Filed: Jun. 12, 2000

(30) Foreign Application Priority Data

Jun. 16, 1999 (KR) .................................. 99-22623
Jun. 5, 2000 (KR) ............................... 00-30803

(51) Int. Cl.[7] .............................. H01J 9/04; H01J 9/12; H01L 21/00
(52) U.S. Cl. ............................ 445/51; 445/50; 438/20; 313/310; 313/311; 313/346 R
(58) Field of Search .................. 445/50, 51; 438/20; 313/309, 310, 311, 346 R

(56) References Cited

U.S. PATENT DOCUMENTS

| 5,318,918 | A | * | 6/1994 | Frazier ...................... 438/20 |
| 5,359,256 | A | | 10/1994 | Gray |
| 5,698,175 | A | | 12/1997 | Hiura et al. .............. 423/447.1 |
| 5,773,921 | A | | 6/1998 | Keesmann et al. |
| 6,087,193 | A | * | 7/2000 | Gray ........................... 438/20 |
| 6,137,219 | A | * | 10/2000 | Song et al. ................ 313/309 |
| 6,525,453 | B2 | * | 2/2003 | Cheng et al. .............. 313/309 |
| 2002/0080099 | A1 | * | 6/2002 | Song et al. ................ 345/75.2 |

FOREIGN PATENT DOCUMENTS

| EP | 0 913 508 A3 | 5/1999 |
| EP | 0 913 508 | 5/1999 |
| FR | 2 698 992 | 6/1994 |
| FR | 2 780 808 | 1/2000 |
| JP | 5-133048 | 5/1993 |
| JP | 8-12310 | 1/1996 |
| KR | 1996-0030296 | 8/1996 |
| WO | WO 20054299 A1 | * 9/2000 ............ H01J/01/30 |

OTHER PUBLICATIONS

J. Itoh, et al., "Ultrastable Emission From A Metal–Oxide–Semiconductor Field–Effect Transistor–Structured Si Emitter Tip," Applied Physics Letters, U.S. America Institute of Physics, vol., 69, Sep. 9, 1996, pp. 1577–1578.

C. Journet et al., "Large–scale production of single–walled carbon nanotubes by the electric–arc technique," Nature, vol. 388, Aug. 21, 1977, pp. 756–758.

D.S. Bethune et al., "Cobalt–catalysed growth of carbon nanotubes with single–atomic–layer walls," Nature, vol. 363, Jun. 17, 1993, pp. 605–607.

(List continued on next page.)

Primary Examiner—Kenneth J. Ramsey
Assistant Examiner—Mariceli Santiago
(74) Attorney, Agent, or Firm—Burns, Doane, Swecker & Mathis, L.L.P.

(57) ABSTRACT

A field emitter having a high current density even at a low voltage using a carbon nanotube film, a method of manufacturing the same, and a field emission display device having the field emitter, are provided, The field emitter includes an insulating substrate. a thin film transistor formed on the insulating substrate, the thin film transistor having a semiconductor layer, a source electrode, a drain electrode and a gate electrode, and an electron emitting unit formed of a carbon nanotube film on the drain electrode of the thin film transistor The thin film transistor can be a coplanar-type transistor, a stagger-type transistor, or an inverse stagger-type transistor. The surface of a portion of the drain electrode, which contacts the carbon nanotube film, contains catalytic metal which is transition metal such as nickel or cobalt. Alternatively, the drain electrode itself can be formed of catalytic metal for carbon nanotube growth.

11 Claims, 4 Drawing Sheets

OTHER PUBLICATIONS

A. Thess et al., "Crystalline Ropes of Metallic Carbon Nanotubes," Science, vol. 273, Jul. 26, 1996, pp. 483–487.

R. Andrews et al., "Continuous production of aligned carbon nanotubes: a step closer to commercial realization," Chemical Physics Letters, Apr. 16, 1999, pp. 467–474.

W.Z. Li et al., "Large–scale Synthesis of Aligned Carbon Nanotubes," Science, vol. 274, Dec. 6, 1996, pp. 1701–1703.

Kingsuk Mukhopadhyay et al., "A Simple and Novel Way to Synthesize Aligned:Nanotube Bundles at Low Temperature," Japan J. Appl. Phys., vol. 37, Part 2, No. 10B, Oct. 15, 1998, pp. L1257–L1259.

Z.F. Ren et al., "Synthesis of Large Arrays of Well–Aligned Carbn Nanotubes on Glass," Science, vol. 282, Nov. 6, 1998, pp. 1105–1107.

M. Kusunoki et al., "Epitaxial carbon nanotube film self–organized by sublimation decomposition of silicon carbide," Appl. Phys. Lett., vol. 71, No. 18, Nov. 3, 1977, pp. 2620–2622.

S. Iijima, "Helical microtubules of graphitic carbon," Nature, vol. 354, Nov. 7, 1991, pp. 56–58.

S. Kanemaru et al., "Active Matrix of Si Field Emitters Driven by Built–in MOSFETS," IDW '97, pp. 735–738, 1997.

H. Gamo et al., "Actively–Controllable Field Emitter Arrays with Built–in Thin Film Transistors on Glass For Active-Matrix FED Applications," IDW '98, pp. 667–670, 1998.

* cited by examiner

FIELD EMITTER HAVING CARBON NANOTUBE FILM, METHOD OF FABRICATING THE SAME, AND FIELD EMISSION DISPLAY DEVICE USING THE FIELD EMITTER

BACKGROUND OF THE INVENTION

1. Field of the Invention

The present invention relates to a field emitter having a carbon nanotube film, a method of fabricating the same, and a field emission display device using the field emitter, and more particularly, to a field emitter having a carbon nanotube film for use as an electron emitting unit, a method of fabricating the field emitter, and a field emission display device using the field emitter.

2. Description of the Related Art

Field emission display devices, which are studied at present as a next-generation flat display device, are based on emission of electrons in a vacuum, and emit light by electrons emitted from micron-sized tips in a strong electric field, accelerating, and colliding with a fluorescent material. The field emission display devices are thin and light with high brightness and high resolution.

Conventional electron emitters for field emission display devices use tips made of metal or silicon, but have very complicated structures and provide a non-uniform current density between pixels. In order to solve the above drawbacks, a metal oxide semiconductor field effect transistor (MOSFET) can be used as an active circuit for each unit pixel, which is disclosed in the paper by S. Kanemaru et al., "Active Matrix of Si Field Emitters Driven by Built-in MOSFETS", IDW'97, pp 735–738, 1997. Also, a thin film transistor can be used as an active circuit for each unit pixel in order to solve the above drawbacks, which is disclosed in the paper by H. Gamo et al., "Actively-Controllable Field Emitter Arrays with Built-in Thin-Film Transistors on Glass for Active-Matrix FED Applications", IDW'98, pp 66–770, 1998. However, the structures disclosed in the above papers become more complicated by adding some processes to a fabrication process for an existing field emission display device.

SUMMARY OF THE INVENTION

An objective of the present invention is to provide a field emitter having a high current density even at a low voltage using a carbon nanotube film.

Another objective of the present invention is to provide a method of manufacturing a field emitter having a carbon nanotube film through a simple process.

Still another objective of the present invention is to provide a field emission display device having a field emitter having a high current density even at a low voltage using a carbon nanotube film.

To achieve the first objective the present invention provides a field emitter having a carbon nanotube film, including: an insulating substrate; a thin film transistor formed on the insulating substrate, the thin film transistor having a semiconductor layer, a source electrode, a drain electrode and a gate electrode;

and an electron emitting unit formed of a carbon nanotube film on the drain is electrode of the thin film transistor.

The semiconductor layer of the thin film transistor can be a polycrystalline silicon layer or an amorphous silicon layer. The thin film transistor can be a coplanartype transistor, a stagger-type transistor, or an inverse stagger-type transistor.

The surface of a portion of the drain electrode, which is to contact the carbon nanqtube film, contains catalytic metal which is transition metal, such as nickel or cobalt, for carbon nanotube growth. Alternatively, the drain electrode itself is formed of catalytic metal for growing carbon nanotubes.

To achieve the second objective, the present invention provides a method of manufacturing a field emitter having a carbon nanotube film, the method including:

forming a thin film transistor having a semiconductor layer, a source electrode, a drain electrode and a gate electrode on an insulating substrate; forming a protective insulating film on the entire surface of the insulating substrate on which the thin film transistor has been formed; etching part of the protective insulating film to expose part of the drain electrode; and forming a carbon nanotube film on the exposed drain electrode, When the thin film transistor is a coplanar-type transistor, the step of forming the thin film transistor includes the substeps of: forming a semiconductor layer on the insulating substrate; forming a source electrode pattern and a drain electrode pattern separated a predetermined distance from each other on the semiconductor layer; and forming a gate electrode pattern consisting of a gate insulating film and a gate electrode, between the source electrode pattern and the drain electrode pattern. When the thin film transistor is a stagger-type transistor, the step of forming the thin film transistor includes the substeps of: forming a source electrode pattern and a drain electrode pattern separated a predetermined distance from each other on the insulating substrate; forming a semiconductor layer pattern extending a predetermined length to the sides while filling the space between the source electrode pattern and the drain electrode pattern; and forming a gate electrode pattern consisting of a gate insulating film and a gate electrode, on the semiconductor layer pattern between the source electrode pattern and the drain electrode pattern. When the thin film transistor is an inverse stagger-type transistor, the step of forming the thin film transistor includes the substeps of: forming a gate electrode pattern consisting of a gate electrode and a gate insulating film, on the insulating substrate; forming a semiconductor layer pattern which covers the gate electrode pattern; and forming a source electrode pattern and a drain electrode pattern separated a predetermined distance from each other on the semiconductor layer pattern.

The step of forming a carbon nanotube film on the exposed portion of the drain electrode can be performed by coating the surface of the exposed portion of the drain electrode with an already-grown carbon nanotube film, or by directly growing the carbon nanotube film on the surface of the exposed portion of the drain electrode. At this time, the method further includes forming a catalytic metal layer for carbon nanotube growth on the surface of a portion of the drain electrode which contacts the carbon nanotube film. The step of forming the catalytic metal layer is performed in the step of forming the thin film transistor or after the step of etching part of the protective insulating film.

To achieve the third objective, the present invention provides a field emission display device in which unit pixels, each of which is defined by a plurality of gate lines and a plurality of data lines which cross at right angles, are arrayed in a matrix, wherein each of the unit pixel includes: a thin film transistor formed on an insulating substrate, the thin film transistor having a semiconductor layer, a source electrode, a drain electrode and a gate electrode; n electron emitting unit formed of a carbon nanotube film on the drain electrode of the thin film transistor; an upper electrode formed opposite to the insulating substrate; and a fluorescent material formed on the bottom surface of the upper electrode, opposite to the electron emitting unit.

In the present invention, a carbon nanotube film is used as an electron emitting unit of a field emitter, so that a field emitter having a high current density even at a low voltage can be realized by a simple manufacturing method. A field emission display device having a uniform current density in each pixel can be realized since it is driven by a thin film transistor.

BRIEF DESCRIPTION OF THE DRAWINGS

The above objectives and advantages of the present invention will become more apparent by describing in detail a preferred embodiment thereof with reference to the attached wings in which.

DESCRIPTION OF THE PREFERRED EMBODIMENT

Hereinafter, embodiments of the present invention will be described in detail with reference to the attached drawings. However, the embodiments of the present invention can be modified into various other forms, and the scope of the present invention must not be interpreted as being restricted to the embodiments, The embodiments are provided to more completely explain the present invention to those skilled in the art.

The present invention is basically associated with formation of an electron emitting unit using carbon nanotube in a field emitter. In general, carbon, which acts as the most important constituent of all kinds of living organisms, including a human body, by combining with oxygen, hydrogen or nitrogen, has four crystalline structures-diamond, graphite, fullerence and carbon nanotube, each of which has peculiar features. Among the four crystalline structures, a carbon nanotube is formed by rolling a hexagonal beehive-patterned structure, formed by combination of one carbon atom with three other carbon atoms, in a tube shape. A carbon nanotube has a very small diameter on the order of several to several hundreds of nanometers, and is grown as a single wall structure or multi-wall structure, A carbon nanotube becomes an electrical conductor such as a metal, or has the properties of a semiconductor that does not transmit electricity well, according to a roiling shape or a diameter. Besides, since a carbo nanotube is hollow and long a carbon nanotube has excellent mechanical, electrical and chemical characteristics, so that it is known as a material capable of being used for field emission devices, hydrogen storage vessels, secondary cell electrodes, and the like.

Figure 1:
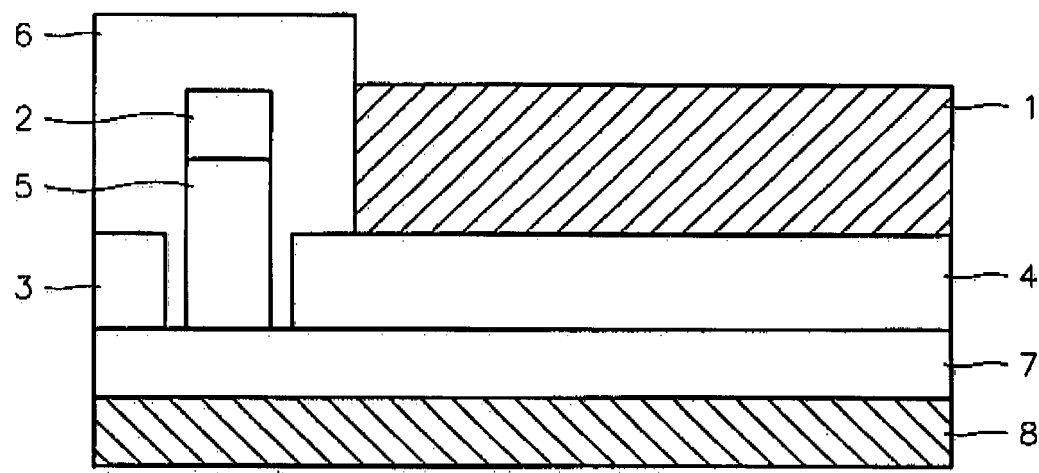
FIG. 1 is a cross-sectional view of a field emitter having a coplanar-type thin film transistor and carbon nanotube pixels, according to an embodiment of the present invention.

FIG. 1 is a cross-sectional view of a field emitter having a coplanar-type thin film transistor and carbon nanotube pixels according to an embodiment of the present invention. Referring to FIG. 1, a semiconductor layer 7 is formed on an insulating substrate a having a firmness, such as a glass substrate. A source electrode 3 pattern and a drain electrode 4 pattern are formed a predetermined distance apart on the semiconductor layer 7, The semiconductor layer 7 can be formed of amorphous silicon or polycrystalline silicon which is doped or undoped with impurities, and the source electrode 3 pattern and the drain electrode 4 pattern are formed by photolithography as in a typical semiconductor device fabrication process.

Each of the source electrode 3 and the drain electrode 4 can be formed of a conductive material such as aluminum, tungsten or refractory metal silicide in a singlelayered structure or multi-layered structure. As described later, when a carbon nanotube film is grown directly on a drain electrode, a catalytic metal layer (not shown) for growing carbon nanotubes, for example, a nickel or cobalt layer, can be formed on the portion of the drain electrode 4 which is to contact the carbon nanotube film 1. That is, the catalytic metal layer can be formed only on portions which are to contact the carbon nanotube film 1, can be formed an the entire surface of the drain electrode 4, or can be formed on the upper surface of the source electrode 3 and on the upper surface of the drain electrode 4. Alternatively, the drain electrode 4 itself can be formed of catalytic metal.

A gate insulating film 5 is formed on a portion of the semiconductor layer 7 exposed between the source electrode 3 pattern and the drain electrode 4 pattern, being separated from the source electrode 3 pattern and the drain electrode 4 pattern. A gate electrode 2 pattern is formed on the gate insulating film 5. A protective insulating film 6 is formed to insulate the source electrode 3, the gate electrode 2 and the drain electrode 4 from one another and to protect them. A carbon nanotube film 1 is formed on the catalytic metal layer (covering part of the surface of the drain electrode 4 in this embodiment).

The gate insulating film 5 can be an oxide film, a nitride film or a combination film of an oxide film and a nitride film, the gate electrode 2 can be formed of aluminum, impurity-doped polysilicon, or the like, and the protective insulating film 6 can be formed of an oxide-series or nitride-series insulating material having an excellent planarization capability.

Then, to be more specific for the process for manufacturing the field emitter shown in FIG. 1, the semiconductor layer 7 is formed on the insulating substrate 8 by a chemical vapor deposition method or a physical vapor deposition method using sputtering. Next, a conductive material layer is formed on the entire surface of the semiconductor layer 7, and then the source electrode 3 pattern and the drain electrode 4 pattern are formed a predetermined distance apart on the semiconductor layer 7 by a typical photolithographic method. As described above, the conductive material layer can be a catalytic metal layer (not shown) for growing 6 carbon nanotubes. When a catalytic metal layer is formed on a general conductive material in a multi-layered structure, the photolithographic process is performed after the catalytic metal layer is formed on the conductive material.

Thereafter, a material layer for the gate insulating film 5 and a material layer for the gate electrode 2 are formed on the entire surface of the substrate, and then the gate insulating film 5 and the gate electrode 2 pattern are formed between the source electrode 3 pattern and the drain electrode 4 pattern by photolithography. Then, the protective insulating film 6 is formed on the entire surface of the substrate on which a thin film transistor is formed, and part of the protective insulating film 6 is etched to expose part of the drain electrode 4. Then, the carbon nanotube film 1 is formed on the exposed drain electrode 4.

The step of forming the carbon nanotube film 1 can be performed by at least two methods. One method is coating the exposed drain electrode 4 with a carbon nanotube film 1 which has been already grown in the outside. Another method is forming a thin film transistor having the semiconductor layer 7, the source electrode 3, the drain electrode 4 and the gate electrode 2, loading a substrate on which part of the drain electrode 4 is exposed into an apparatus for growing carbon nanotubes, and growing the carbon nanotube film 1 directly an the exposed drain electrode 4.

As for the method of growing carbon nanotubes, a method of generating carbon nanotubes between two graphite rods through arc discharge is disclosed in the paper by Sumio Iijima, "Helical Microtubules of Graphitic Carbon", Nature, Vol. 354, pp 56–58, Nov. 7, 1991, As another method of growing carbon nanotubes, a method of generating carbon nanotubes at about 1200° C. or greater when graphite is irradiated by laser light, or generating carbon nanotubes at about 1600 to 1700° C. when silicon carbide is irradiated by laser light, is disclosed in the paper by Michiko Kusunoki et al., "Epitaxial Carbon Nanotube Film Self-organized by Sublimation Decomposition of Silicon Carbide", Appl. Phys. Lett, Vol 71. 2620, 1997. A method of generating carbon nanotubes by thermally decomposing hydrocarbon-series gas using a chemical vapor deposition (CVD) method is disclosed in the paper by W. Z. Li et al, "Large-scale Synthesis of Aligned Carbon Nanotubes", Science, Vol. 274, pp 1701–1703, Dec. 6, 1996.

As described above, the growth of carbon nanotubes in the present invention s can use arc discharge, laser, CVD, or high density plasma.

In an embodiment of the present invention, a high density plasma CVD method is used, and an inductively coupled plasma (ICP) apparatus capable of generating high density plasma by applying radio frequency power is used as a plasma chemical vapor apparatus. A hydrocarbon-series gas such as acetylene or benzene containing carbon atoms can be used as a source gas of plasma for growing the carbon nanotube film 1. However, the present embodiment uses methane $CH_4$ which is supplied at a flow rate of about 10 SCCM together with helium He, which is an inert gas, at a flow rate of about 10 SCCM, In the present embodiment, the carbon nanotube film 1 is grown with RF power fixed at 1 kW, at a substrate temperature of 600 to 900° C., and at an internal pressure of 10 to 1000 mTorr. Nitrogen ($N_2$) gas or hydrogen ($H_2$) gas can also be used to accelerate the reaction, and the density of plasma in the present embodiment is kept at $10^{11} cm^{-3}$ or greater.

Figure 2:
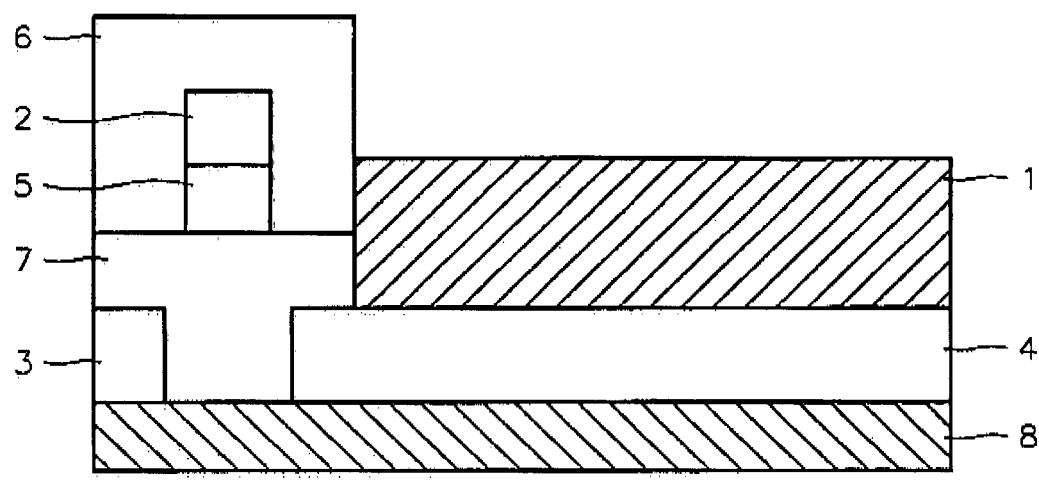
FIG. 2 is a cross-sectional view of a field emitter having a stagger-type thin film transistor and carbon nanotube pixels, according to another embodiment of the present invention.

FIG. 2 is a cross-sectional view of a field emitter having a stagger-type thin film transistor and carbon nanotube pixels, according to another embodiment of the present invention. The same reference numerals as those of FIG. 1 denote the same elements, so they will not be described in detail, Referring to FIG. 2, the source electrode 3 pattern and the drain electrode 4 pattern are spaced a predetermined distance from each other on the insulating substrate B. A semiconductor layer 7 extending a predetermined length to the sides while filling the space between the source electrode 3 pattern and the drain electrode 4 pattern, is formed. A gate electrode 2 pattern having a gate insulating film 5 and a gate electrode 2 is formed on the semiconductor layer 7 over the space between the source electrode 3 pattern and the drain electrode 4 pattern. A protective insulating film 6 covers the gate electrode 2 pattern. A carbon nanotube film 1 is formed on part of the surface of the drain electrode 4.

As described above, the source electrode 3 and the drain electrode 4 can be formed in a single-layered or multi-layered structure from a conductive material.

When a carbon nanotube film is grown directly on a drain electrode, a catalytic metal layer (not shown) for growing carbon nanotubes can be formed on the surface of the drain electrode 4 which is to contact the carbon nanotube film 1. That is, the catalytic metal layer can be formed only on portions which are to contact the carbon nanotube film 1, can be formed on the entire surface of the drain electrode 4, or can be formed on the upper surface of the source electrode 3 and on the upper surface of the drain electrode 4 for convenience of the process. Alternatively, the drain electrode 4 itself can be formed of catalytic metal.

Then, to be more specific for the process for manufacturing the field emitter shown in FIG. 2, a conductive material layer is formed on the entire surface of the insulating substrate 8, and then the source electrode 3 pattern and the drain electrode 4 pattern are formed a predetermined distance apart on the insulating substrate 8 by a typical photolithographic method. As described above, the conductive material layer can be a catalytic metal layer for growing carbon nanotubes. In case that a catalytic metal layer is formed on a general conductive material in a multi-layered structure, the photolithographic process is performed after the catalytic metal layer is formed on the conductive material. Next, the semiconductor layer 7 is formed on the insulating substrate 8 by a chemical vapor deposition method or a physical vapor deposition method using sputtering, and patterned by photolithography, thereby forming the semiconductor layer 7 pattern extending a predetermined length to the sides while filling the interval between the source electrode 3 and the drain electrode 4.

Thereafter, a material layer for the gate insulating film 5 and the gate electrode 2 is formed on the entire surface of the substrate, and then the gate electrode 2 pattern consisting of the gate insulating film 5 and the gate electrode 2 is formed on the semiconductor layer 7 over the space between the source electrode 3 pattern and the drain electrode 4 pattern by photolithography. Then, the protective insulating film 6 is formed on the entire surface of the substrate on which a thin film transistor is formed, and part of the protective insulating film 6 is etched to expose part of the drain electrode 4. Next, the carbon nanotube film 1 is formed on the exposed drain electrode 4. The step of forming the carbon nanotube film 1 is the same as in the embodiment of FIG. 1.

Figure 3:
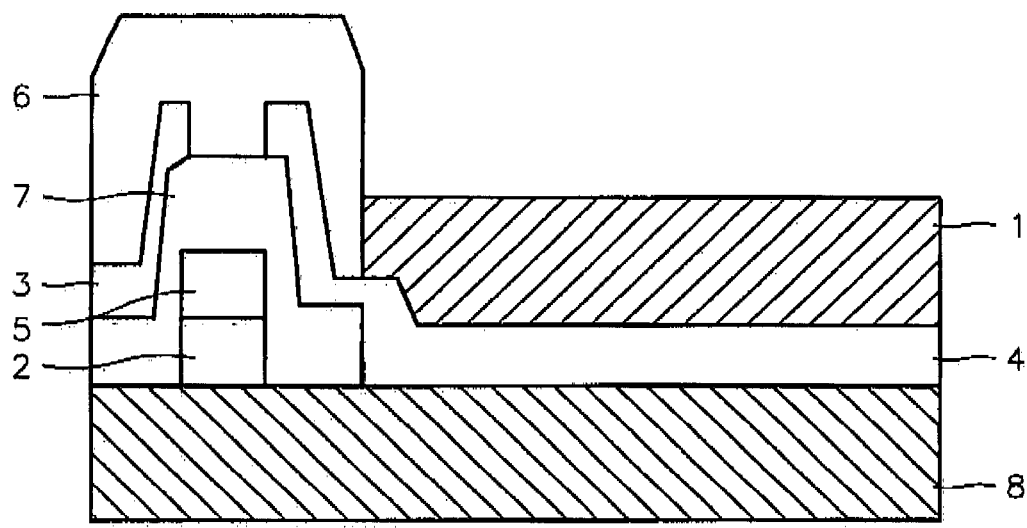
FIG. 3 is a cross-sectional view of a field emitter having an inverse stagger-type thin film transistor and carbon nanotube pixels, according to still another embodiment of the present invention.

FIG. 3 is a cross-sectional view of a field emitter having an inverse stagger-type thin film transistor and carbon nanotube pixels according to still another embodiment of the present invention. The same reference numerals as those of FIG. 1 denote the same elements, so they will not be described in detail. Referring to FIG. 3, a gate electrode 2 pattern having a gate electrode 2 and a gate insulating film is formed on a insulating substrate 8. A semiconductor layer 7 pattern covers the gate electrode 2 pattern. A source electrode 3 pattern and a drain electrode 4 pattern are spaced a predetermined distance from each other on the semiconductor layer 7 pattern. A protective insulating film 6 covering and filling the space between the source electrode 3 pattern and the drain electrode 4 pattern, is formed. A carbon nanotube film 1 is formed on part of the surface of the drain electrode 4.

To be more specific for the process for manufacturing the field emitter shown in FIG. 3, a material layer for the gate electrode 2 and the gate insulating film 5 is formed on the entire surface of the insulating substrate 8, and then the gate electrode 2 pattern consisting of the gate electrode 2 and the gate insulating film 5 is formed on the insulating substrate 8 by photolithography. Next, a semiconductor layer 7 is formed on the entire surface of the insulating substrate 8 and patterned by photolithography, thereby forming the semiconductor layer 7 pattern that covers the gate electrode 2 pattern. Then, a conductive material layer is formed on the entire surface of the resultant structure, and then the sources electrode 3 pattern and the drain electrode 4 pattern are formed I?being spaced a predetermined distance from each other by a typical photolithographic method. Next, the protective insulating film 6 is formed on the entire surface of the substrate on which a thin film transistor is formed, and part of the protective insulating film 6 is etched to expose part of the drain electrode 4. Then, the carbon nanotube film 1 is formed on the exposed drain electrode 4. The step of forming the carbon nanotube film 1 is the same as in the embodiment of FIG. 1

Figure 4:
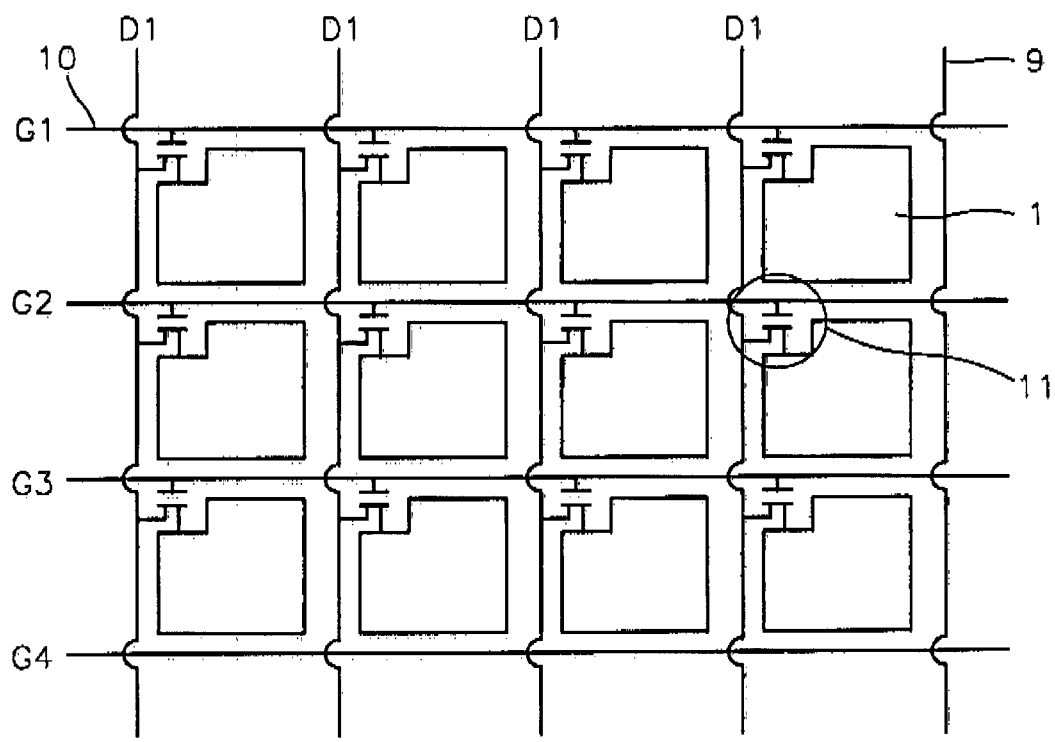
FIG. 4 is an equivalent circuit diagram of a field emission display device using a field emitter according to an embodiment of the present invention.

FIG. 4 is an equivalent circuit diagram of an active-matrix field emission display device using a field emitter according to an embodiment of the present invention, Referring to FIG. 4, a plurality of gate lines 10 (G1, G2, G3, . . . ) cross a plurality of data lines 9 (D1, D2, D3, . . . ) at right angles, and a unit pixel is defined by two gate lines 10 and two data lines 9. These unit pixels are arrayed in a matrix. A carbon nanotube film 1, which is an electron emitting unit, is formed in each unit pixel$_1$, and thin film transistors 11 are provided as switch units for driving these electron emitting units. Each of the thin film transistors 11 has a gate electrode connected to a gate line 10. a source electrode connected to a data line 9, and a drain electrode connected to the carbon nanotube film 1 which is an electron emitting unit. The cross-section of an electron emitter having the thin film transistors 11 and the carbon nanotube film 1 can be one of the coplanar-type field emitter, the stagger-type field emitter or the inverse stagger-type emitter of FIGS. 1 through 3, respectively.

Figure 5A:
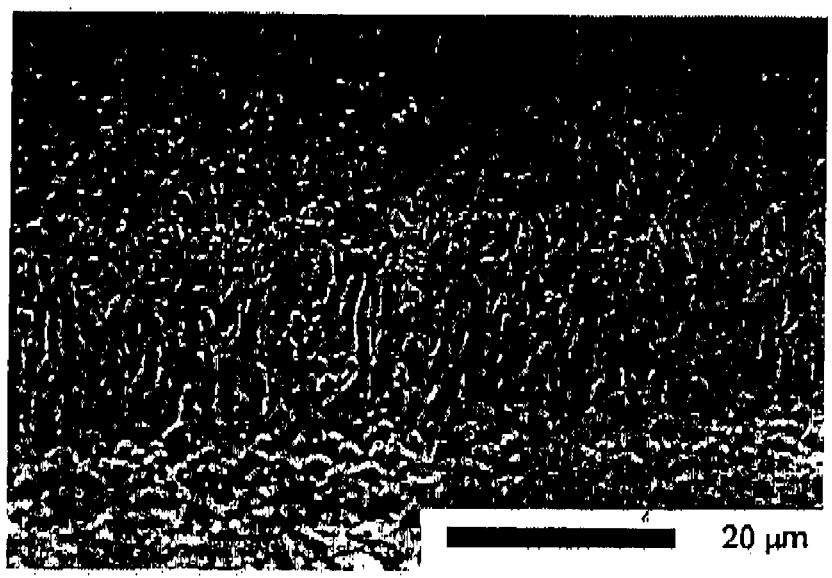
FIG. 5A is a scanning electron microscope (SEM) image of a grown carbon nanotube film according to an embodiment of the present invention.
Figure 5B:
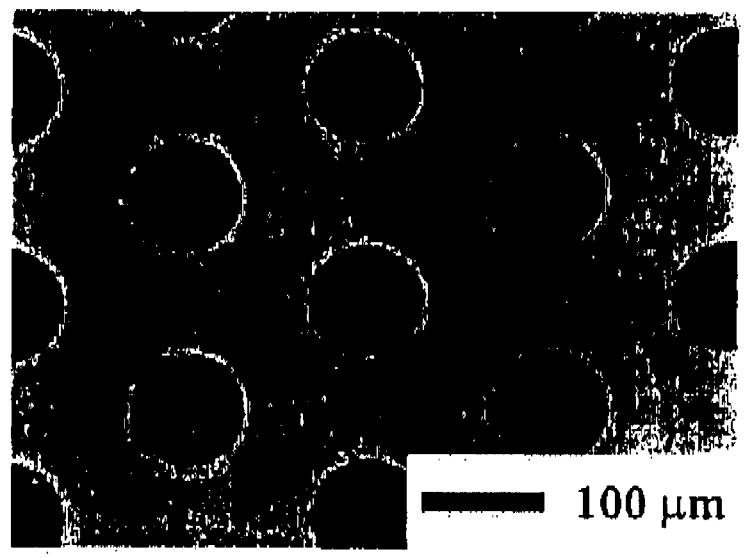
FIG. 5B is a transmission electron microscope (TEM) image of a carbon nanotube film deposited on each unit pixel in a field emission display device according to an embodiment of the present invention.

FIG. 5A is a scanning electron microscope (SEM) image of a grown carbon nanotube film according to an embodiment of the present invention, which shows nanotube bundles arranged well in one direction. FIG. 5B is a transmission electron microscope (TEM) image of a carbon nanotube film formed on each drain electrode in each unit pixel of a field emission display device according to an embodiment of the present invention. It can be seen from FIG. 5B that carbon nanotube films are selectively grown on only an exposed surface of a drain electrode.

Figure 6:
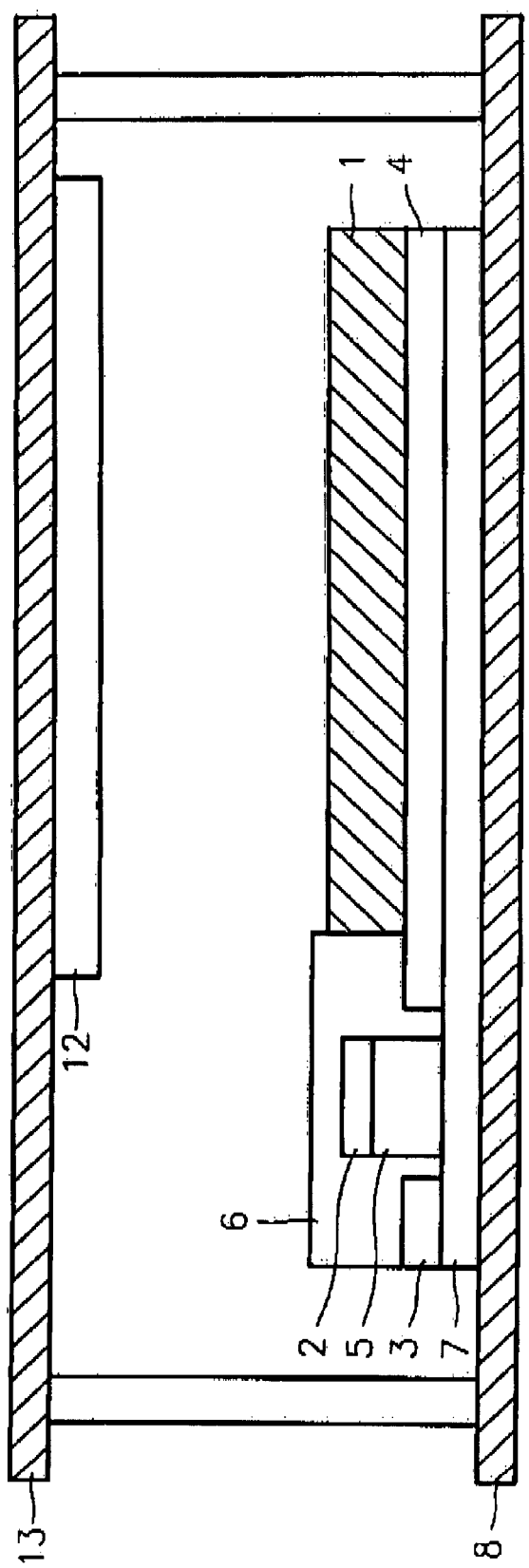
FIG. 6 is a cross-sectional view of a field emission display device according to an embodiment of the present invention.

FIG. 6 is a cross-sectional view of a field emission display device according to an embodiment of the present invention, which shows the cross-section of a unit pixel in each pixel arrayed in an active matrix. The coplanar-type thin film transistor shown in FIG. 1 is used as the thin film transistor 11, which is a switching device.

Referring to FIG. 6, an upper electrode 13 is installed over an insulating substrate 8, separated from the insulating substrate 8 by a predetermined distance. A semiconductor layer 7 is formed on the insulating substrate 8. A source electrode 3 pattern and a drain electrode 4 pattern are spaced a predetermine distance from each other on the semiconductor layer 7. A gate insulating film 5 is formed on the semiconductor layer 7 exposed between the source electrode 3 pattern and the drain electrode 4 pattern, separated from the source electrode 3 pattern and from the drain electrode 4 pattern, thereby forming a gate electrode 2 pattern, A protective insulating film 6 covers the source electrode 3, the gate electrode 2 and part of the drain electrode 4 while filling the intervals between them, to insulate them from one another and protect them, A carbon nanotube film 1 is formed on part of the surface of the drain electrode 4. A fluorescent material 12 is formed an the bottom surface of the upper electrode 13 so that it is opposite to the carbon nanotube film 1.

In the electron emission display device, as shown in FIG. 4, electrons are emitted from the carbon nanotube film 1 by the driving of the thin film transistor 11 included in a pixel selected by the transmission of a signal via a gate line 10 and a data line 9. The emitted electrons are accelerated boy a strong electric field between the upper electrode 13 and the drain electrode 4 and cause light to be emitted by collision with the fluorescent material 12. In this way, the electron emission display devise performs a display function. Carbon nanotubes with a nanometer size are similar to or smaller than tips used in conventional field emitters, but provide better field emission characteristics than other tips when used as an electron emitting unit.

Although the present invention has been described with reference to particular embodiments shown in the drawings, the particular embodiments are just examples. It is apparent to those skilled in the art that various modifications to the particular embodiments may be made within the scope of the present invention. For example, although the present embodiments simply form carbon nanotubes using high density plasma, it is apparent that the carbon nanotubes can be formed by an arc technique, a laser technique or a chemical vapor deposition technique.

According to the present invention, an active-matrix field emission display device, which has a high current density and can be driven at a low voltage, can be easily manufactured using carbon nanotubes and a thin film transistor. Also, the active field emission display device according to the present invention can maintain uniform and stable emission current by controlling current using the thin film transistor. Therefore, a current driven field emission display device can be easily realized.

What is claimed is:

1. A method of manufacturing a field emitter having a carbon nanotube film, the method comprising:
   forming a thin film transistor having a semiconductor layer, a source electrode, a drain electrode and a gate electrode on an insulating substrate;
   forming a protective insulating film on the entire surface of the insulating substrate on which the thin film transistor has been formed;
   etching part of the protective insulating film to expose part of the drain electrode; and
   forming a carbon nanotube film on the exposed drain electrode.

2. The method of claim 1, wherein the step of forming the thin film transistor comprises the substeps of:
   forming a semiconductor layer on the insulating substrate;
   forming a source electrode pattern and a drain electrode pattern separated a predetermined distance from each other on the semiconductor layer; and forming a gate electrode pattern consisting of a gate insulating film and a gate electrode, between the source electrode pattern and the drain electrode pattern.

3. The method of claim 1, wherein the step of forming the thin film transistor comprises the substeps of:

forming a source electrode pattern and a drain electrode pattern separated a predetermined distance from each other on the insulating substrate;

forming a semiconductor layer pattern extending a predetermined length to the sides while filling the space between the source electrode pattern and the drain electrode pattern; and forming a gate electrode pattern consisting of a gate insulating film and a gate electrode, on the semiconductor layer pattern between the source electrode pattern and the drain electrode pattern.

4. The method of claim 1, wherein the step of forming the thin film transistor comprises the substeps of:

forming a gate electrode pattern consisting of a gate electrode and a gate insulating film, on the insulating substrate;

forming a semiconductor layer pattern which covers the gate electrode pattern, and forming a source electrode pattern and a drain electrode pattern separated a predetermined distance from each other on the semiconductor layer pattern.

5. The method of claim 1, wherein the step of forming a carbon nanotube film on the exposed portion of the drain electrode is performed by-coating the 3 surface of the exposed portion of the drain electrode with a carbon nanotube film.

6. The method of claim 1, wherein the step of forming a carbon nanotube film on the exposed portion of the drain electrode is performed by directly growing a the carbon nanotube film on the surface of the exposed portion of the drain electrode.

7. The method of claim 6, further comprising forming a catalytic metal layer for carbon nanotube growth on the surface of a portion of the drain electrode which contacts the carbon nanotube film.

8. The method of claim 7, wherein the step of forming the catalytic metal layer is performed in the step of forming the thin film transistor.

9. The method of claim 7, wherein the step of forming the catalytic metal layer is performed after the step of etching part of the protective insulating film.

10. The method of claim 6, wherein the drain electrode is formed of catalytic metal for carbon nanotube growth.

11. The method of claim 6, wherein the carbon nanotube film is grown at 600 to 900° C. using hydrocarbon-series gas as plasma source gas by plasma chemical vapor deposition wherein the density of plasma is $100^{11} cm^{-13}$ or greater.

* * * * *